United States Patent
Feith et al.

(10) Patent No.: US 12,149,132 B2
(45) Date of Patent: Nov. 19, 2024

(54) SEGMENTED GENERATOR, GENERATOR SEGMENT AND WIND TURBINE, AND ALSO METHOD FOR PREPARING TRANSPORTATION OF A SEGMENTED GENERATOR, AND FOR TRANSPORTING AND INSTALLING THE SAME, AND ALSO METHOD FOR ASSEMBLING A WIND TURBINE

(71) Applicant: Wobben Properties GmbH, Aurich (DE)

(72) Inventors: Manuel Feith, Esens (DE); Wojciech Giengiel, Aurich (DE); Stephan Jöckel, Kleinniedesheim (DE); Alexander Philipp, Reilingen (DE); Sebastian Bauer, Henstedt-Ulzburg (DE); Lars Fischer, Norden (DE); Wilko Gudewer, Norden (DE); Andreas Recktenwald, Saarbrücken (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 18/257,857

(22) PCT Filed: Dec. 17, 2021

(86) PCT No.: PCT/EP2021/086444
§ 371 (c)(1),
(2) Date: Jun. 15, 2023

(87) PCT Pub. No.: WO2022/129493
PCT Pub. Date: Jun. 23, 2022

(65) Prior Publication Data
US 2024/0097537 A1    Mar. 21, 2024

(30) Foreign Application Priority Data

Dec. 18, 2020 (EP) .................... 20215456

(51) Int. Cl.
*H02K 15/02* (2006.01)
*F03D 9/25* (2016.01)
(Continued)

(52) U.S. Cl.
CPC ............... *H02K 15/02* (2013.01); *F03D 9/25* (2016.05); *F03D 13/40* (2016.05); *H02K 7/1838* (2013.01);
(Continued)

(58) Field of Classification Search
CPC ...... H02K 15/02; H02K 7/1838; H02K 21/22; F03D 9/25
See application file for complete search history.

(56) References Cited

U.S. PATENT DOCUMENTS

2012/0181792 A1* 7/2012 Pettersen ................ F03D 80/00
290/55

FOREIGN PATENT DOCUMENTS

DE    102010039590 A1    2/2012
DE    102012208547 A1    11/2013
(Continued)

*Primary Examiner* — Sean Gugger
(74) *Attorney, Agent, or Firm* — Seed IP Law Group LLP

(57) ABSTRACT

The disclosure relates to a generator segment of a segmented generator, in particular of a permanently excited segmented rotary generator, of a wind turbine, comprising a rotor segment of a rotor, and a stator segment of a stator, wherein the rotor segment and the stator segment in an operation position are disposed so as to be mutually spaced apart in a radial direction by an air gap, and are disposed so as to be mutually spaced apart in an axial direction by an axial spacing; wherein the rotor segment and the stator segment are able to be disposed and/or displaced relative to one another along a rotation axis by the axial spacing, between an operation position and a transport position that is different from the operation position.

17 Claims, 19 Drawing Sheets

(51) Int. Cl.
*F03D 13/40* (2016.01)
*H02K 7/18* (2006.01)
*H02K 21/22* (2006.01)

(52) U.S. Cl.
CPC ...... *H02K 21/22* (2013.01); *F05B 2220/7068* (2013.01); *F05B 2230/60* (2013.01); *F05B 2260/02* (2013.01)

(56) References Cited

FOREIGN PATENT DOCUMENTS

| | | |
|---|---|---|
| EP | 0953668 A1 | 11/1999 |
| EP | 1772624 A2 | 4/2007 |
| EP | 2632030 A2 | 8/2013 |
| EP | 2 508 749 B1 | 9/2013 |
| EP | 2731232 A1 | 5/2014 |
| EP | 2 454 803 B1 | 5/2017 |
| WO | WO 2015024590 A1 | 2/2015 |
| WO | WO 2020034266 A1 | 2/2020 |

* cited by examiner

SEGMENTED GENERATOR, GENERATOR SEGMENT AND WIND TURBINE, AND ALSO METHOD FOR PREPARING TRANSPORTATION OF A SEGMENTED GENERATOR, AND FOR TRANSPORTING AND INSTALLING THE SAME, AND ALSO METHOD FOR ASSEMBLING A WIND TURBINE

BACKGROUND

Technical Field

The disclosure relates to a generator segment of a segmented generator for a wind turbine, to a segmented generator for a wind turbine, and to a wind turbine. The disclosure furthermore relates to a method for preparing transportation of a segmented generator of a wind turbine, to a method for transporting a segmented generator of a wind turbine, to a method for assembling a segmented generator of a wind turbine, and to a method for assembling a wind turbine.

Description of the Related Art

A wind turbine is a system that converts kinetic energy from wind into electric energy and feeds it into a power grid. For the conversion of the kinetic energy into electric energy, the wind turbine comprises a generator with a rotor, which is mounted so as to be rotatable about a rotation axis relative to a stator. Depending on the position of the rotation axis, a distinction is made between a horizontal and a vertical wind turbine. In the case of the horizontal wind turbine, the rotation axis is aligned horizontally. In the case of the vertical wind turbine, the rotation axis is aligned vertically. Horizontal wind turbines are also known as horizontal axis wind turbines, and vertical wind turbines are also known as vertical axis wind turbines.

Modern wind turbines generally concern so-called horizontal-axis wind turbines, in the case of which the rotation axis is disposed substantially horizontally and the rotor blades sweep through a substantially vertical rotor area. Furthermore, wind turbines have a nacelle which is disposed on a tower of the wind turbine so that it can rotate about a substantially vertical axis.

When the wind turbine is in an operating state, the wind causes rotation of the rotor blades which drive the rotor of a generator that is coupled to the rotor blades. In the operating condition, the rotor blades and the rotor rotate relative to a stator of the generator. Due to the relative movement between rotor and stator, the (electric) generator generates electric energy. In the operating state of the wind turbine, the wind turbine is constructed at the installation site and is operated to convert the kinetic energy of the wind into electric energy.

Wind turbines can be embodied without a gear or with a gear. In particular, gearless wind turbines have generators with a large diameter. It is quite common for the generators to have a diameter of 5 m and more. These generators can be embodied as so-called internal rotors or as so-called external rotors. In the case of an internal rotor, the rotor of the generator rotating conjointly with the rotor blades is disposed inside a stationary stator of the generator. In the case of an external rotor, the rotor is disposed outside the stator. In the case of the external rotor, the stator is in particular disposed inside the rotor, preferably so as to be radially inside in terms of the rotor. Irrespective of the type of generator, generators are usually fastened to the nacelle, in particular a machine support, of the wind turbine.

Generators can reach a mass of 150 t and more. The transport of such generators is therefore always associated with a great complexity. Depending on the size, diameter and mass of the generator, road transport may also be simply impossible. In order to also be able to transport generators with a large diameter and a large mass, it is known to configure generators as segmented generators. Such a segmented generator has two or a plurality of generator segments. The generator segments are usually configured in a part-annular manner or have a part-annular geometry. The generator segments are typically disposed to form an annular segmented generator. Generator segments are usually transported individually to the installation site of a wind turbine.

The transport of generator segments of a segmented generator with electromagnets is easily possible without great complexity. If these generator segments are de-energized, no magnetic forces are effective. On the other hand, if such a segmented generator has permanent magnets, additional fastening devices must be provided which hold a rotor segment in a desired position relative to a stator segment and counteract the magnetic forces of the permanent magnets. Such fastening devices, which hold a rotor segment in relation to a stator segment, are known, for example, from EP 2 508 749 B1 and EP 2 454 803 B1.

The assembly of these components, which are unwieldy despite segmentation, is associated with challenges. On the one hand, the handling of the components at the construction site is difficult and, moreover, the precise setting of an air gap between the rotor and the stator with the required accuracy is possible only with auxiliary means. Moreover, the ease of maintaining the existing solutions is limited so that the maintenance is often complex and cost-intensive.

The European Patent Office has searched the following prior art in the priority application for the present application: WO 2015/024590 A1, EP 0 953 668 A1, WO 2020/034266 A1, EP 2 731 232 A1, DE 10 2010 039590 A1, DE 10 2012 208547 A1, EP 2 632 030 A2, EP 1 772 624 A2.

BRIEF SUMMARY

Some embodiments provide a segmented generator for a wind turbine, a generator segment of the segmented generator, a wind turbine as well as a method for preparing transportation of a segmented generator, a method for transporting the segmented generator, a method for assembling the segmented generator, and a method for assembling a wind turbine, that eliminate or minimize one or a plurality of the disadvantages mentioned. Some embodiments provide a solution that enables improved ease of transportation and/or reduces the complexity in terms of assembling and/or enables improved ease of maintenance.

Some embodiments include a segmented generator for a wind turbine.

Unless expressly stated otherwise, information pertaining to an axial direction, a circumferential direction and a radial direction in the description is to be understood in terms of a rotation axis of the generator. The axial direction corresponds to a direction parallel to, i.e., along the rotation axis. The circumferential direction corresponds to a direction substantially tangential to the rotation axis. The radial direction corresponds to a direction radial to the rotation axis.

The segmented generator is preferably configured as a permanently excited generator. However, it may also be preferable for the segmented generator to be configured as separately excited generator and the generator segments, rotor segments and stator segments of the latter to this extent are preferably configured for the separately excited operation.

The segmented generator for a wind turbine comprises two or a plurality of generator segments. The two or more generator segments are preferably disposed in an annular manner. In particular, the two or more generator segments are disposed coaxially with a rotation axis of the segmented generator. In particular, the segmented generator comprises a segmented rotor and a segmented stator. The segmented rotor includes two or a plurality of rotor segments. The segmented stator includes two or a plurality of stator segments.

The respective generator segment or the respective rotor segment and/or the respective stator segment are preferably configured in a part-annular manner in a circumferential direction in relation to the rotation axis. In particular, the generator segment or the rotor segment and/or the stator segment have a part-annular geometry. A generator segment or a rotor segment and/or a stator segment, which is correspondingly configured in a part-annular manner or has a part-annular geometry, extends in the circumferential direction with a specific degree of arc between a first and second separation interface.

The two or more generator segments or the two or more rotor segments and/or two or more stator segments preferably extend with the same degree of arc in the circumferential direction. In particular, the generator segments or the rotor and/or stator segments extend as a function of the following formula, depending on the number of the respective segments: 360°/(number of segments). According to this, for example, the generator segments of a segmented generator, which comprises two generator segments, extend in the circumferential direction by 180°, with three generator segments it would be 120°, with four generator segments it would be 90° etc. This can apply in an analogous manner to the rotor segments and/or stator segments.

It may also be preferable that the generator segments, from which a segmented generator is assembled, extend in the circumferential direction with a different degree of arc. For example, a segmented generator can be formed from three generator segments. In such a segmented generator, for example, a first generator segment can extend in the circumferential direction by 180°, a second generator segment by 120° and a third generator segment by 60°. Any other extents in the circumferential direction of the generator segments are conceivable, provided they result in an extent of 360° in the circumferential direction. The explanations regarding the generator segment can apply in an analogous manner to a rotor segment of a segmented rotor and/or a stator segment of a segmented stator.

The first and the second separation interfaces extend substantially orthogonally to the circumferential direction. In particular, the first and the second separation interfaces define first and second separation interface planes within which the rotation axis extends. In particular, the first and/or the second separation interface extend/extends in such a manner that the first and/or the second separation interface plane extend/extends in a radial direction in relation to the rotation axis. In particular, the first and/or the second separation interface planes, which extend in the radial direction in terms of the rotation axis, intersect in an axis that is or defines the rotation axis. In particular, the rotation axis lies in the first and/or the second separation interface plane, which extend/extends in the radial direction in relation to the rotation axis.

The first and/or the second separation interface of a generator segment have/has a connecting device. The connection device at the first and/or the second separation interface is configured to connect to one another adjacent generator segments that are disposed to form a segmented generator. The connecting device of the first and/or the second disconnection interface is configured in particular to mechanically connect adjacent generator segments. The mechanical connection can be configured as a force-fitting and/or materially integral and/or form-fitting connection. The first and/or the second separation interface preferably have/has a flange connection and/or a threaded connection as a connection device for fastening generator segments adjacent in the circumferential direction. The explanations pertaining to the generator segment can apply in an analogous manner to a rotor segment of a segmented rotor and/or a stator segment of a segmented stator.

In particular, it can be preferred that the rotor segment, in particular its magnet carrier segment, extends in the circumferential direction between the first and the second separation interface with a segment length, wherein the rotor segment or the magnet carrier segment has an external circumferential face with a first separation interface section with a first length proceeding from the first separation interface in the circumferential direction toward the second separation interface; and a second separation interface portion with a second length proceeding from the second separation interface in the circumferential direction toward the first separation interface; and a connecting portion with a third length extending between the first and the second separation interfaces; wherein a reinforcement device for reinforcing the magnet carrier segment is disposed in the region of the first and the second separation interface section on the circumferential face of the rotor. In addition or as an alternative, it can be preferred that the rotor segment has a reinforcement ring segment and/or a reinforcement disk.

In addition or as an alternative, it is also preferred that the segmented generator is configured as a permanently excited segmented generator. In this preferred embodiment it is provided that one or a plurality of permanent magnets are disposed on the rotor. A permanent magnet, also known as a permanently excited magnet, is a magnet that has a constant magnetic field that is not generated by electric power, as is the case with electromagnets. The permanent magnet comprises or is composed of a magnetized material. Examples of magnetized materials of a permanent magnet are alloys of iron, cobalt, nickel, etc.

The segmented generator is preferably configured as an external rotor. In the case of a segmented generator configured as an external rotor, the stator or segmented stator in relation to the rotor or segmented rotor in the radial direction is located on the inside in terms of the rotation axis. In the case of a segmented generator configured as an external rotor, its segmented rotor lying radially on the outside usually encloses the segmented stator lying radially on the inside.

With the segmented design of the generator, transport-related size restrictions of a generator can be overcome. In particular, as a result of the individual transport of the generator segments, segmented generators can also be transported to installation sites of wind turbines that are difficult to access and assembled on the tower of the wind turbine on the nacelle. In particular, no large and expensive special cranes are required for the assembly of a segmented generator. Rather, the generator segments can be positioned individually on the nacelle or the machine support with a small crane, which only has to carry the mass of a single generator segment and reach the assembly height. This saves costs that would otherwise be incurred for the much more expensive large cranes. Furthermore, such large cranes are generally only available to a limited extent, so that the segmented generator offers more flexibility with regard to the assembly time and also the assembly site.

In terms of further advantages, design variants and design details of the segmented generator according to the disclosure and its refinements, reference is also made to the following description of the corresponding features and refinements of the generator segment, the wind turbine and the methods.

Some embodiments include a generator segment of a segmented generator for a wind turbine. It is to be understood that the generator segment is a generator segment for a segmented generator, in particular for a permanently excited, segmented rotary generator. It is furthermore to be understood that the segmented generator, in particular the permanently excited segmented rotary generator, is a segmented generator for a wind turbine.

Such a generator segment of a segmented generator of a wind turbine comprises, as already described above, a rotor segment of a rotor and a stator segment of a stator. It is provided that the rotor segment and the stator segment in an operation position are disposed so as to be mutually spaced apart in a radial direction by an air gap, and are disposed so as to be mutually spaced apart in an axial direction by an axial spacing. The rotor segment and the stator segment are able to be disposed and/or displaced relative to one another along a rotation axis by the axial spacing, between an operation position and a transport position that is different from the operation position.

The rotor segment has in particular a magnet carrier segment with an annular or part-annular geometry, at least one laminated rotor core and a rotor internal circumferential face. In particular, the at least one rotor laminated core is connected to the magnet carrier segment in a materially integral and/or force-fitting and/or form-fitting manner. A plurality of magnet units are preferably disposed on the rotor laminated core at a spacing from one another in the circumferential direction and form and/or define the rotor internal circumferential face. The at least one magnet unit is in particular connected in a materially integral manner to the laminated rotor core. A casting compound, which at least partially encloses the magnet unit, preferably connects the magnet unit to the rotor laminated core. The magnet units are also known as rotor active parts.

The stator segment has in particular a coil carrier segment with an annular or part-annular geometry, a first and a second carrier plate and a stator circumferential structure. The first and second carrier plates are spaced from each other in the axial direction. Preferably, the stator circumferential structure connects the first and the second carrier plates to one another. The stator circumferential structure is, for example, an assembly of one or a plurality of axial struts, which have a direction of main extent substantially along the rotation axis in the axial direction. A plurality of axial struts are spaced apart from one another, preferably equidistantly, in particular in the circumferential direction. It is to be understood that the coil carrier segment preferably forms the first and the second carrier plate and/or the stator circumferential structure integrally, in particular in one piece. Preferably, at least one stator laminated core for receiving at least one coil unit is disposed on the stator circumferential structure. The at least one stator laminated core is in particular fastened to the coil carrier segment by way of a stator fastening device. The stator fastening device is configured, for example, as a clamping device for the force-fitting and/or form-fitting connection of the at least one stator laminated core to the coil carrier segment. In particular, a plurality of coil units are disposed on the stator laminated core. The stator laminated core with the coil units disposed thereon is also known as the stator active part.

In the operation position of the generator segment, the stator active part and the rotor active part are preferably disposed so as not to be mutually offset in the axial direction, but so as to be in particular centered in relation to one another. The stator active part and the rotor active part in the operation position are in particular disposed so as to be mutually offset in the axial direction by 0 mm. In the transport position of the generator segment, the stator active part and the rotor active part are preferably disposed so as to be offset in the axial direction, in particular not centered in relation to one another. The stator active part and the rotor active part in the transport position are preferably disposed so as to be mutually offset in the axial direction by the axial spacing.

In particular, the stator active part and the rotor active part are disposed so as to be spaced apart in the radial direction by an air gap. The air gap between the stator active part and the rotor active part in the transport position preferably corresponds to the air gap between the stator active part and the rotor active part in the operation position. It is preferred in particular that the coil units disposed on the stator segment or the stator are disposed so as to be spaced apart in the radial direction from the magnets disposed on the rotor or the rotor segment by the air gap.

It can be preferred in particular that the stator segment is disposed so as to be stationary, and the rotor segment is able to be disposed and/or displaced relative to the stator segment along the rotation axis by the axial spacing, between the operation position and the transport position that is different from the operation position. It can also be preferred that the rotor segment is disposed so as to be stationary, and the stator segment is able to be disposed and/or displaced relative to the rotor segment along the rotation axis by the axial spacing, between the operation position and the transport position that is different from the operation position.

In the operation position, the rotor segment and the stator segment are in particular positioned and aligned relative to one another in such a manner that the air gap and the axial spacing between the rotor segment and the stator segment correspond in each case to the air gap and the axial spacing between the segmented rotor and the segmented stator of a segmented generator in the operation state of the wind turbine. In the transport position, the rotor segment and the stator segment are preferably positioned and aligned relative to one another in such a manner that the axial spacing between the rotor segment and the stator segment do not correspond to the axial spacing between the segmented rotor and the segmented stator of a segmented generator in the operation position. The rotor segment and the stator segment preferably have one or a plurality of contact faces. The rotor segment and/or the stator segment preferably have contact faces disposed so as to be mutually equidistant in the circumferential direction. The contact faces are preferably disposed so as to be mutually spaced apart by 15°, 30°, 45° or 90°. The rotor segment and the stator segment in the transport position at the respective one or the respective plurality of contact faces preferably bear on one another at least in a punctiform manner and/or in portions. In the transport position, the rotor segment and the stator segment are in particular in mutual contact. In the transport position the axial spacing between the one or the plurality of contact faces of the rotor segment and of the stator segment is in particular equal to 0 mm.

In the operation position, the axial spacing between the one or the plurality of contact faces of the rotor segment and the stator segment is more than 0 mm between the one or the plurality of contact faces of the rotor segment and the one or the plurality of contact faces of the stator segment. In the operation position, the axial spacing between the one or the plurality of contact faces of the rotor segment and the one or the plurality of contact faces of the stator segment is in particular at least 2 mm, 5 mm, 7.5 mm, 10 mm, 12 mm 15 mm, 20 mm or more. Further preferably, the axial spacing between the one or the plurality of contact faces of the rotor segment and the one or the plurality of contact faces of the stator segment is at most 100 mm, 50 mm, 20 mm, 15 mm, 12 mm 7.5 mm, 5 mm or less.

When the rotor segment and the stator segment are displaced relative to one another from the operation position to the transport position, the generator segment is preferably aligned in such a manner that the rotation axis is vertically oriented. The vertical orientation is in particular preferred for transportation using a transport device configured as a motor truck. However, when the rotor segment and the stator segment are displaced relative to one another from the operation position to the transport position, it may also be preferred that the generator segment is preferably aligned in such a manner that the rotation axis is horizontally oriented. The horizontal orientation is in particular preferred for transportation using a transport device configured as a transport ship. When the rotor segment and the stator segment are displaced relative to one another from the transport position to the operation position, the generator segment is preferably aligned in such a manner that the rotation axis is not vertically oriented. In particular, when displacing the rotor segment and the stator segment relative to one another from the transport position to the operation position, the rotation axis is substantially horizontally aligned.

The air gap is an air gap between the rotor and the stator that encircles a circumferential direction tangential or parallel to the rotation axis. The air gap corresponds in particular to a spacing between a rotor and a stator, in particular a spacing of a rotor internal circumferential face from a stator external circumferential face, provided that the generator is configured as an external rotor. The air gap corresponds in particular to a spacing between a rotor and a stator, in particular a spacing of a rotor internal circumferential face from a stator external circumferential face in the radial direction. It is to be understood that, in the case of a generator configured as an internal rotor, the air gap corresponds to the spacing between a rotor and a stator in particular a spacing of a rotor external circumferential face from a stator internal circumferential face. The air gap is set in particular in the operation position.

Such a preferred embodiment has the advantage that a compact segmented generator can be produced, on the one hand, and easy assembling and adjustments for manufacturing-related inaccuracies can in particular be performed, on the other hand.

In the operating state of the wind turbine, the segmented generator is fastened in particular to a bearing unit. The bearing unit has a stationary bearing part and a rotating or rotatable bearing part. The rotatable bearing part by means of bearing elements, for example ball bearings, roller bearings, barrel bearings or the like, is rotatably mounted relative to the stationary bearing part about the rotation axis. In the operating state, the segmented stator is fastened to the stationary bearing part. In the operating state, the segmented rotor is fastened to the rotatable bearing part. In order to fasten the stator, the bearing unit preferably has a stator main body flange on the stationary bearing part. In order to fasten the rotor, the bearing unit preferably has a rotor main body flange on the rotatable bearing part. It is to be understood that the flange faces of the stator main body flange and of the rotor main body flange are disposed at a spacing, in particular the axial spacing, from one another.

The rotor segment preferably extends in the radial direction between a radially inner flange for fastening the rotor segment to the rotor base body flange of a bearing unit and the radially outer magnet carrier segment. The rotor segment preferably by way of a rotor support portion extends between the radially inner flange for fastening the rotor segment to the rotor main body flange of the bearing unit and the radially outer magnet carrier segment. It is to be understood that the rotor segment can be configured in multiple parts or integrally. In particular, it should be understood that the rotor segment can be formed integrally from individual rotor segments welded to one another.

The stator segment preferably extends in the radial direction between a radially inner flange for fastening the stator segment to a stator main body flange of the bearing unit and a radially outer coil carrier segment. In particular, the stator segment is configured as a shell structure. The stator segment preferably extends in the shape of a truncated pyramid from the flange to the coil carrier segment lying radially on the outside, wherein the cross section of the stator segment increases from the flange to the coil carrier segment lying radially on the outside. In particular, the stator segment forms, preferably integrally, a stator support portion which proceeding from the radially inner flange extends to the radially outer coil carrier segment.

Such a generator segment has the advantage that wind turbines with generators having a particularly large diameter and thus a particularly high output can be provided.

Furthermore, as a result of the segmented construction mode, generators of a large diameter can be produced in a particularly cost-effective manner and be provided in a cost-effective manner at the respective installation site. This segmented construction mode also makes it possible for individual segments to be able to be easily replaced in the event of damage or for maintenance work.

Such a segmented construction mode furthermore has the advantage that the assembling of the segmented generator on the nacelle, or on the machine support, of the wind turbines can be performed according to two principles:

On the one hand, the generator segments can be fastened to a bearing unit so as to form an annular segmented generator, and adjacent generator segments can be fastened to one another, on the ground. Thereafter, the segmented generator assembled on the ground can be assembled on the machine support of the nacelle on the tower with the aid of a large crane. This has the advantage that the segmented generator can largely be assembled on the ground, and only the fastening of the already segmented generator to the machine support has to be performed "up in the air".

On the other hand, the generator segments can be individually lifted up to the machine support and fastened thereto with the aid of a small crane. In this procedure, the generator segments are thus fastened sequentially to the machine support of the nacelle on the tower. Thereafter, the adjacent generator segments are fastened to one another in the circumferential direction.

The generator segment according to the disclosure and its refinements have features that make them particularly suitable for being used with a segmented generator according to the disclosure and/or a method according to the disclosure and its refinements. In terms of further advantages, design variants and design details of the generator segment according to the disclosure and its refinements, reference is also made to the previous description of the corresponding features and refinements of the segmented generator and the following description of the corresponding features and refinements of the wind turbine and the method.

According to one preferred embodiment of the generator segment, the air gap in the operation position corresponds to the air gap in the transport position.

The air gap preferably does not change when the rotor segment is displaced relative to the stator segment. In particular, when the rotor segment is displaced relative to the stator segment, from the operation position to the transport position and vice versa, the air gap remains substantially constant, in particular in the radial direction.

This has the advantage that the desired air gap for the operation, or the operation state, of wind turbine can already be adjusted ex works, and the setting does not have to be readjusted at the construction site at the installation site of the wind turbine. In particular, the air gap can be set ex works under monitored conditions. As a result, costs can be saved and the complexity in terms of the final assembly can be reduced.

According to a furthermore preferred refinement of the generator segment, the rotor segment has one or a plurality of first and/or second fastening connectors, wherein preferably a plurality of first and/or second fastening connectors are disposed so as to be mutually equidistant in a circumferential direction; and/or the stator segment has one or a plurality of first and/or second fastening connectors; wherein preferably a plurality of first and/or second fastening connectors are disposed so as to be mutually equidistant in a circumferential direction; wherein the rotor segment and the stator segment are preferably connected to one another by way of the respective first and/or second fastening connectors in the transport position.

It is furthermore preferable that the generator or the generator segment has a bearing unit which is configured to mount the rotor of the generator so as to be rotatable in relation to the stator of the generator. It is provided in particular that the bearing unit has the fastening device for fastening, or for locking, the rotor or the rotor segment in relation to the stator or the stator segment. This has in particular the advantage that the number of days during which a large crane is required is reduced. The assembly costs can be significantly reduced as a result. Furthermore, the assembly time can additionally be reduced and simplified as a result of a generator segment configured in such a manner, or by a generator configured in such a manner.

The first and/or the second fastening connectors of the rotor segment and/or of the stator segment are in each case configured in particular as fastening faces. The fastening faces are in particular machined. The respective fastening faces of the first and/or the second fastening connectors of the rotor segment and/or of the stator segment preferably extend substantially orthogonally to the rotation axis. It may also be preferable for the respective fastening faces of the first and/or the second fastening connectors of the rotor segment and/or of the stator segment to extend substantially parallel to the rotation axis.

The first fastening connectors of the rotor segment are preferably disposed so as to be rotated by 90° in relation to the first fastening connectors of the stator segment. In particular, the first fastening connectors of the stator segment configure a fastening face which extends substantially orthogonally to the rotation axis. In particular, the first fastening connectors of the stator segment configure a fastening face which extends substantially parallel to the rotation axis. In particular, the fastening faces of the first fastening connectors of the rotor segment are in each case disposed on an inner circumference of the rotor segment. In this arrangement, a surface normal extends substantially in the radial direction toward the rotation axis.

It is furthermore preferred that the second fastening connectors of the rotor segment are disposed so as to be mutually parallel in relation to the second fastening connectors of the stator segment. In particular, the second fastening connectors of the rotor segment and of the stator segment configure in each case a fastening face which extends substantially orthogonally to the rotation axis. Preferably, one fastening face of the second fastening connectors of the rotor segment and of the second fastening connectors of the stator segment are in each case directed toward one another. The fastening faces directed toward one another of the second fastening connectors of the rotor segment and of the stator segment are in mutual contact in the transport position.

The first and the second fastening connectors of the stator segment, in particular the fastening faces thereof, in the axial direction preferably point in opposite directions.

The first and/or the second fastening connectors of the rotor segment and/or of the stator segment are in each case preferably disposed at a radial spacing from the rotation axis. The radial spacing of the second fastening connectors of the rotor segment and/or of the stator segment are preferably substantially identical. The radial spacing of the first fastening connectors of the rotor segment is preferably larger than the radial spacing of the first fastening connectors of the stator segment. In particular, the radial spacings of the second fastening connectors of the rotor segment and/or of the stator segment are larger than the radial spacing of the first fastening connectors of the rotor segment. It may be preferable that the radial spacings of the second fastening connectors of the rotor segment and/or of the stator segment are larger than the radial spacing of the first fastening connectors of the stator segment and smaller than the radial spacing of the first fastening connectors of the rotor segment.

It is preferred in particular that the first and/or the second fastening connectors of the rotor segment and/or of the stator segment have through bores or threaded bores for receiving screw connections. The respective fastening faces of the first and/or the second fastening connectors of the rotor segment and/or of the stator segment preferably have two or more, in particular four, through bores or threaded bores which extend in particular substantially orthogonally to the respective fastening face. The through bores or threaded bores of the second fastening connectors of the rotor segment and/or of the stator segment preferably extend substantially parallel to the rotation axis. It may also be preferable for the through bores or threaded bores of the first fastening connectors of the stator segment to extend substantially parallel to the rotation axis. It is in particular preferred that the through bores or threaded bores of the first fastening connectors of the rotor segment extend substantially orthogonally to the rotation axis.

In particular, the one or plurality of first and/or second fastening connectors of the stator segment are configured as the one or plurality of contact faces of the stator segment.

Furthermore, the one or plurality of first and/or second fastening connectors of the rotor segment are preferably configured as the one or plurality of contact faces of the rotor segment.

The first and/or the second fastening connectors of the rotor segment and/or of the stator segment have the advantage that the rotor segment and the stator segment can be particularly easily disposed and displaced with high accuracy in the axial direction between the transport position and the operation position.

In particular, the through bores and/or threaded bores, aligned substantially in the axial direction, of the second fastening connectors of the rotor segment and/or of the stator segment have the advantage that a screwing movement of a screw leads in a simple manner to an axial relative movement between the rotor segment and the stator segment.

Furthermore, the first fastening connectors of the rotor segment that are disposed so as to be rotated by 90° in relation to the fastening connectors of the stator segment have in particular the advantage that the rotor segment and the stator segment in the displacement from the operation position to the transport position or vice versa keep the air gap in the radial direction between the segments constant and serve as a radial guide.

According to a further preferred embodiment, the generator segment comprises a fastening device for fixing the rotor segment to the stator segment in the transport position, wherein the fastening device preferably comprises one first and second fastening unit, wherein the first fastening unit is preferably different from the second fastening unit; and/or a guide device for guiding the mutually displaceable rotor segment and stator segment along the rotation axis, from the operation position to the transport position and/or vice versa; wherein the guide device preferably comprises one first and second guide unit, wherein the first guide unit is preferably different from the second guide unit.

The fastening device is in particular a releasable fastening device. In particular in the operation position of the wind turbine, the releasable fastening device is not fastened to the generator segment or the segmented generator.

The fastening device has the advantage that in the transport position the stator segment in relation to the rotor segment in the axial direction can be fixed at a desired axial spacing and in the radial direction can be fixed with a desired air gap.

The guide device has the advantage that the stator segment and the rotor segment guide one another in a relative manner during displacement from the operation position to the transport position and vice versa. In particular, the air gap can advantageously be kept constant by the guide device during displacement from the operation position to the transport position and vice versa.

In a further preferred embodiment of the generator segment, the fastening device comprises a screw device for fixing the rotor segment to the stator segment in the transport position; and/or the first fastening unit having an angular element having two fastening faces, each in particular having one or a plurality of elongate bores configured as through bores, and one screw device; and/or the second fastening unit comprising a screw device; and/or the guide device comprising one or a plurality of locking pins configured as the first guide unit; and/or the first fastening unit configured as the second guide unit.

The screw devices of the first and the second fastening unit have the advantage that the fastening device can be rapidly fixed to the generator segment, or the segmented generator, and released therefrom again. The screw device of the second fastening unit has in particular the advantage that said screw device can cause and/or facilitate the displacement of the rotor segment and of the stator segment relative to one another. The angular element of the first fastening unit has the advantage that said angular element can also serve as a guide device and to this extent no separate guide device has to be provided. Furthermore, the locking pins can advantageously guide the displacement of the rotor segment and of the stator segment relative to one another.

Some embodiments include a wind turbine. Such a wind turbine comprises a segmented generator according to the disclosure, in particular a segmented generator according to one of the previously described embodiments or a combination thereof.

In terms of advantages, design variants and design details of the wind turbine according to the disclosure and its refinements, reference is also made to the previous description of the corresponding features and refinements of the segmented generator and of the generator segment, and to the following description of the corresponding features and refinements of the methods.

Some embodiments include a method for preparing transportation of a segmented generator.

The method for preparing transportation of a segmented generator, in particular of a permanently excited segmented rotary generator, of a wind turbine, the segmented generator having a stator having two or more stator segments, and a rotor having two or more rotor segments which are disposed concentrically with a rotation axis; wherein the rotor and the stator in an operation position are disposed so as to be mutually spaced apart in a radial direction by an air gap, and are disposed so as to be mutually spaced apart in an axial direction by an axial spacing; and wherein one stator segment of the two or more stator segments and one rotor segment of the two or more rotor segments form in each case one generator segment; the method characterized by the following steps: Providing the segmented generator; and displacing the rotor and the stator of the produced segmented generator in the operation position relative to one another along the rotation axis of the rotor by the axial spacing, from the operation position to a transport position that is different from the operation position.

According to one preferred embodiment, the segmented generator has a bearing unit to which the rotor and/or the stator are/is fastened; the method comprising the following steps: releasing the rotor and/or the stator from the bearing unit.

According to a furthermore preferred embodiment, the segmented generator has: a fastening device, wherein the fastening device preferably comprises one first and/or second fastening unit, wherein preferably the first fastening unit is different from the second fastening unit; and/or a guide device, wherein the guide device preferably comprises one first and/or second guide device, wherein preferably the first guide device is different from the second guide device; the method comprising the following steps: fixing the rotor and the stator to one another in the transport position by way of the fastening device; wherein the step of fixing comprises in particular one of the following steps solely or in combination:

providing a first and/or a second fastening unit (501; 502); and/or disposing the first and/or the second fastening unit (501, 502) on the stator; and/or aligning the first fastening unit in relation to the rotor; and/or fastening the rotor and the stator to one another by way of the first and/or the second fastening unit (501, 502); and/or guiding the rotor and the stator relative to one another by way of a guide device during the step of displacing the rotor and the stator of the produced segmented generator in the operation position relative to one another, from the operation position to the transport position and/or vice versa.

It is furthermore preferably provided that the step of fixing the rotor and the stator to one another by way of the fastening device in the transport position comprises arranging the fastening device on the bearing unit. As a result, the rotor can remain in the transport position until shortly before commissioning, said transport position corresponding to an assembly position during assembling, so that a large crane for assembling is required for only a comparatively minor number of days. The assembly costs are significantly reduced as a result.

In one furthermore preferred embodiment, during the step of displacing the rotor and the stator of the produced segmented generator in the operation position relative to one another along the rotation axis of the rotor by the axial spacing, from the operation position to a transport position and/or vice versa, the air gap in the radial direction remains substantially constant.

According to a furthermore preferred refinement, the method for preparing transportation of a segmented generator of a wind turbine comprises the following step: dividing the segmented generator into two or more generator segments.

Some embodiments include a method for transporting a segmented generator of a wind turbine.

The method for transporting a segmented generator, in particular a permanently excited segmented rotary generator, of a wind turbine, comprising providing a segmented generator as described herein and divided into two or more generator segments for transportation; and/or disposing and fastening one generator segment of the provided two or more generator segments of the divided segmented generator on a transport device; and/or transporting the generator segment disposed and fastened on the transport device by the transport device. It is to be understood that providing the segmented generator as described herein and divided into two or more generator segments for transportation is providing a segmented generator divided into two or more generator segments as described herein.

Some embodiments include a method for assembling a segmented generator of a wind turbine.

The method for assembling a segmented generator, in particular a permanently excited segmented rotary generator, of a wind turbine, comprising providing the two or more generator segments of the divided segmented generator as described herein; and/or disposing the provided two or more generator segments of the segmented generator so as to form a segmented generator in the transport position; and/or fastening adjacent generator segments of the two or more generator segments disposed in an annular manner so as to form a segmented generator; and/or fastening the provided two or more generator segments of the divided segmented generator to a bearing unit. It is to be understood that providing the two or more generator segments of the divided segmented generator as described herein for transportation is providing a segmented generator divided into two or more generator segments as described herein.

In one preferred embodiment of the method for assembling a segmented generator of a wind turbine, the step of fastening the two or more provided generator segments of the divided segmented generator to the bearing unit comprises one of the following steps solely or in combination: Aligning the bearing unit radially on the stator; and/or fastening the bearing unit, in particular a stator support of the bearing unit, to the stator; and/or releasing the fastening device from the rotor and the stator in the transport position; and/or sliding the rotor onto the bearing unit, in particular onto a rotor support of the bearing unit; wherein the bearing unit serves in particular as a guide device for the rotor; and/or displacing the rotor in relation to the stator in a mutually relative manner along the rotation axis of the rotor by the axial spacing, from the transport position to the operation position; and/or fastening the bearing unit, in particular a rotor support of the bearing unit, to the rotor.

It is to be understood that it may be preferred in particular that the fastening device is released only from the rotor or from the stator. It is preferred in particular that for the operation of the wind turbine the fastening device is fastened only to the rotor and released from the rotor, or is fastened only to the stator and released from the rotor. This facilitates the assembling and commissioning of the wind turbine.

Some embodiments include a method for assembling a wind turbine.

The method for assembling a wind turbine comprising: providing a tower of a wind turbine in a state for installation having disposed thereon a nacelle with a machine support; and providing the two or more generator segments of the divided segmented generator as described herein; and/or fastening, in particular sequential fastening, of the provided two or more generator segments of the divided segment generator to the machine support so as to form a segmented generator; and/or providing a bearing unit; and/or fastening the bearing unit to the machine support of the nacelle and/or to the two or plurality of generator segments, in particular to a segmented stator of the segmented generator; and/or displacing a segmented rotor of the segmented generator relative to the segmented stator of the segmented generator along a rotation axis by the axial spacing, from a transport position to an operation position, wherein the operation position is different from the transport position; and/or fastening the segmented rotor to the bearing unit in the operation position; and/or rotating the segmented rotor fastened to the bearing unit, and/or fastening generator segments adjacent in a circumferential direction to one another so as to form the segmented generator, in particular fastening the rotor segments disposed adjacently in the circumferential direction so as to form a segmented rotor. The steps of rotating the segmented rotor fastened to the bearing unit and of fastening generator segments adjacent in a circumferential direction to one another so as to form the segmented generator is preferably performed iteratively. In particular, the number of iterations corresponds to the two mentioned method steps of rotating and fastening the number of generator segments included in the segmented generator to be assembled. It is to be understood that providing the two or more generator segments of the divided segmented generator as described herein for transportation is providing a segmented generator divided into two or more generator segments as described herein.

Such a method has in particular the advantage that the segmented rotor, upon fastening to the bearing unit, can be rotated such that the separation interfaces of adjacent generator segments that are to be connected to one another are aligned above a nacelle of the wind turbine. As a result, the separation interfaces, or the flange connections disposed on the separation interfaces of the generator segments, can be safely accessed from the nacelle and the adjacent generator segments fastened to one another, in particular with screws or the like. This enables a final assembly of the generator to be carried out on the tower at an increased level of occupational safety. This advantage is derived in particular in the case of external rotors because the flange connections on the latter can be reached with ease and comfort. In contrast, the stator is not rotatable in the case of internal rotors so that the flange connections of the stator are more difficult to reach and to this extent can be fastened to one another only with a greater effort.

The method according to the disclosure and its possible refinements have features or method steps that make them particularly suitable for being used for a segmented generator according to the disclosure and/or a generator segment according to the disclosure and/or a wind turbine according to the disclosure and the respective refinements. In terms of further advantages, design variants and design details of these further aspects and their possible developments, reference is also made to the description given above with regard to the corresponding features and developments of the generator segment and of the segmented generator and of the wind turbine.

BRIEF DESCRIPTION OF THE SEVERAL VIEWS OF THE DRAWINGS

Embodiments will be explained by way of example with the aid of the appended figures.

DETAILED DESCRIPTION

In the figures, identical or substantially functionally identical or similar elements are denoted by the same reference designations. If general reference is made to a generator, rotor or stator in the present description of the figures, this in principle includes a segmented generator, segmented rotor or segmented stator, unless this is expressly described otherwise.

Figure 1:
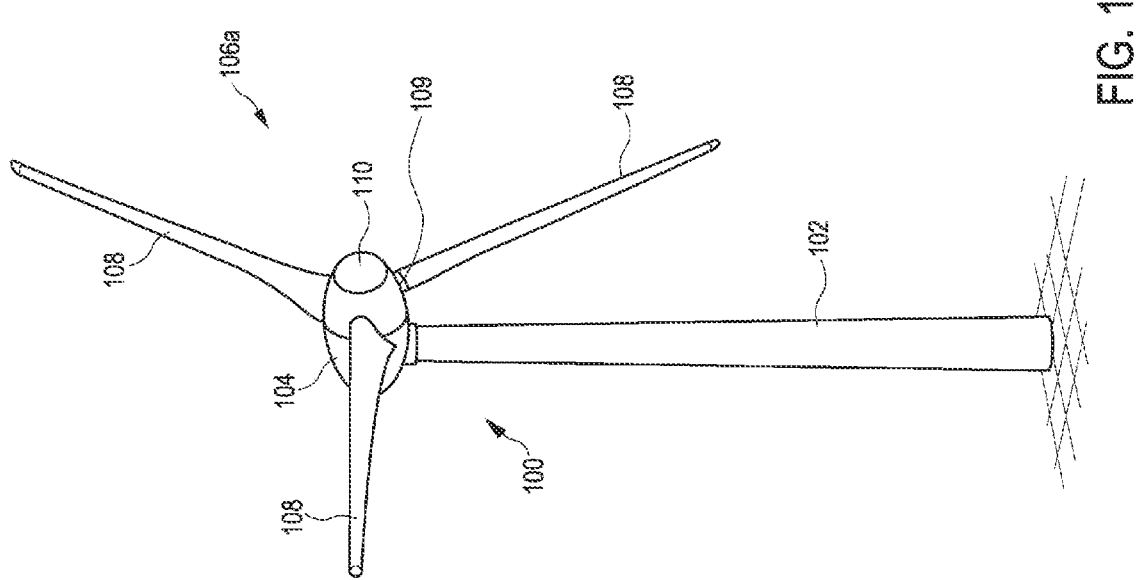
FIG. 1 shows a schematic, three-dimensional view of an embodiment of a wind turbine in an operating state.

FIG. 1 shows a schematic three-dimensional view of an embodiment of a wind turbine. FIG. 1 shows in particular a wind turbine 100 with a tower 102 and a nacelle 104. An aerodynamic rotor 106a with three rotor blades 108 and a spinner 110 is disposed on the nacelle 104. During operation, the aerodynamic rotor 106a is set in rotation by the wind and thereby drives a generator 1, in particular a rotor 106 of the generator 1. The generator 1 is disposed in particular outside the nacelle 104. The tower 102 has, in particular, wind turbine steel tower ring segments with flange segments. As a result, the tower 102 is constructed by means of components that are easy to transport and that can also be connected with great precision and with little effort.

Figure 2:
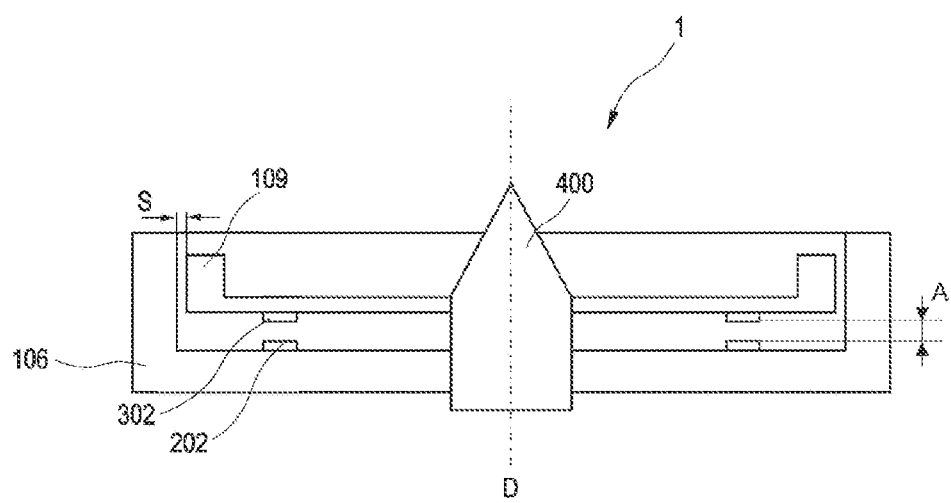
FIG. 2 shows a schematic, two-dimensional sectional view of an embodiment of a generator segment in the operation position.
Figure 3:
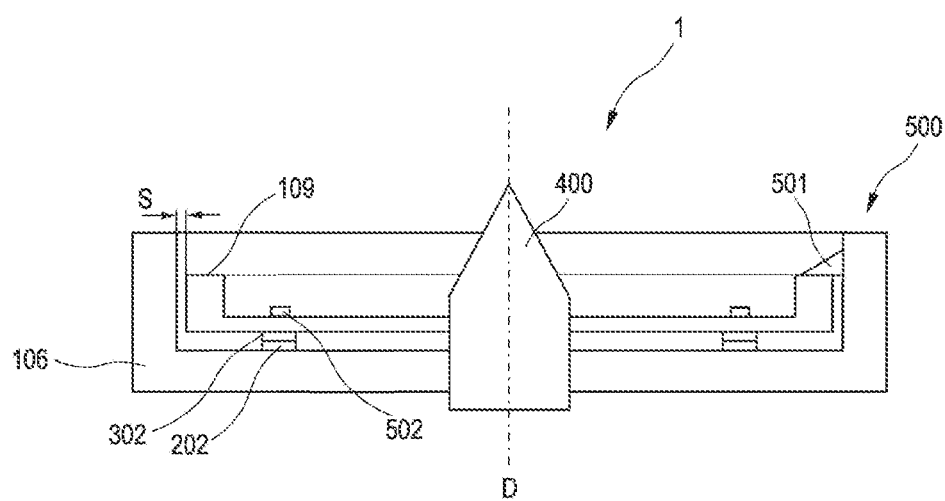
FIG. 3 shows a schematic, two-dimensional view of the embodiment of a generator segment shown in FIG. 2 in the transport position.

FIGS. 2 and 3 show a schematic, two-dimensional sectional view of an embodiment of a segmented generator 1 in the operation position (cf. FIG. 2) and the transport position (FIG. 3). The segmented generator 1 has a segmented rotor 106 and a segmented stator 109, which are fastened to a bearing unit 400. The rotor 106 as well as the stator 109 are annularly configured and aligned so as to be concentric with a rotation axis D. The rotor 106 by means of the bearing unit 400 is mounted so as to be rotatable about the rotation axis D in relation to the stator 109.

To this end, the bearing unit 400 has a stationary bearing part 401 and a rotating or rotatable bearing part 403. The rotatable bearing part 403 by means of bearing elements 405, for example ball bearings, roller bearings, barrel bearings or the like, is mounted so as to be rotatable about the rotation axis D in relation to the stationary bearing part 401. The stator 109 is fastened to the stationary bearing part 401. The rotor 106 is fastened to the rotatable bearing part 403. In order to fasten the stator 109, the bearing unit 400 preferably has a stator main body flange 402 on the stationary bearing part 401. In order to fasten the rotor 106, the bearing unit 400 preferably has a rotor main body flange 404 on the rotatable bearing part 403. The details pertaining to the bearing unit 400 and to the fastening of the rotor 106 and of the stator 109 on the bearing unit 400 can be derived from FIG. 7, for example.

The stator 109 is disposed within the rotor 106. In this preferred embodiment, the rotor completely encloses a stator external circumferential face of the stator 109 with a rotor internal circumferential face. This preferred embodiment of the segmented generator illustrated in FIGS. 2 and 3 is also known as an external rotor.

The stator 109 is disposed within the rotor 106 so as to be spaced apart in a radial direction, orthogonal to the rotation axis D, by an air gap S. The air gap S is an air gap between the rotor 106 and the stator 109 that encircles a circumferential direction tangential to the rotation axis. In particular, the air gap S corresponds to the spacing, in particular in the radial direction, between the rotor internal circumferential face of the rotor 106 and the stator external circumferential face of the stator 109. The desired air gap is set in the operation position. The air gap in the transport position corresponds to the air gap in the operation position. In particular, the air gap S does not change during the displacement of the rotor 106 relative to the stator 109 from the operation position and vice versa.

In the operation position, illustrated in FIG. 2, of the segmented generator 1, the rotor 106 and the stator 109 are mutually spaced apart along the rotation axis D in an axial direction by an axial spacing A. The axial spacing is preferably not more than 20 mm. When the rotor 106 and the stator 109 are displaced along the rotation axis D by the axial spacing A, from the operation position to the transport position, the axial spacing A decreases. The axial spacing A decreases to 0 mm as soon as the rotor 106 and the stator 109 are in mutual contact. FIG. 3 schematically shows this arrangement.

The rotor 106 and the stator 109 of the preferred embodiment of the segmented generator 1 schematically illustrated in FIGS. 2 and 3 comprise in each case first fastening connectors 201, 301 (not illustrated) and second fastening connectors 202, 302. The first and the second fastening connectors 201, 301, 202, 302 are in each case configured as fastening faces. The fastening faces of the first fastening connectors 201 of the rotor 106 extend substantially parallel to the rotation axis D, and the fastening faces of the first fastening connectors 301 of the stator 109 extend substantially orthogonally to the rotation axis D. To this extent, the fastening faces of the first fastening connectors 201, 301 of the rotor 106 and of the stator 109 are disposed orthogonally to the rotation axis so as to be mutually rotated by substantially 90°. The surface normal of the fastening face of the first fastening connectors extends substantially in the radial direction toward the rotation axis. The fastening faces of the second fastening connectors of the rotor 106 and of the stator 109 extend substantially orthogonal to the rotation axis D. The fastening faces of the second fastening connectors of the rotor 106 and of the stator 109 are directed toward one another. The surface normal of the fastening faces of the second fastening connectors of the rotor 106 and of the stator 109 extend substantially parallel to the rotation axis D.

In the transport position, illustrated in FIG. 3, of the segmented generator 1, a first fastening unit 501 and a second fastening unit 502 of a fastening device 500 are illustrated. The second fastening unit 502 has a screw device by way of which the rotor 106 can be fixed in relation to the stator 109 in the transport position. It is to be understood that the second fastening unit 502 acts in particular so as to fix the rotor to the stator in the axial direction. In contrast to the second fastening unit 502, the first fastening unit 501 additionally has an angular element with two fastening faces. The angular element of the first fastening unit 501 is disposed on the first fastening connectors 201, 301 of the rotor 106 and of the stator 109. The first fastening unit 501 serves in particular for fixing the stator in relation to the rotor in the radial direction, orthogonal to the rotation axis D, in the transport position.

However, it is to be understood that the first fastening unit 501 can also be configured as a second guide unit 602 of a guide device 600. The guide device 600 is configured to guide the rotor 106 and the stator 109, which are displaceable relative to one another, along the rotation axis D, from the operation position to the transport position and vice versa. To this end, the angular element of the first fastening units 501 are firstly disposed on the first fastening connectors 301 of the stator 109. Thereafter, the angular elements are displaced radially outward up to the first fastening connectors 201 of the rotor 106 such that the angle bears in a planar manner and is aligned on the first fastening connector 201 of the rotor 106. In this arrangement, the angular elements are fastened to the first fastening connectors 301 of the stator 109 by way of a screw device. As a result, the air gap S, as originally set ex works, is not changed even during a displacement of the rotor 106 relative to the stator 109, between the operation position and the transport position. In the transport position, the angular elements for transportation can then also be screwed to the first fastening connectors 201 of the rotor 106.

The first and the second fastening connectors of the rotor segment and of the stator segment are in each case disposed at a radial spacing from the rotation axis. In this preferred embodiment of the segmented generator, the radial spacings of the second fastening connectors of the rotor segment and of the stator segment are larger than the radial spacing of the first fastening connectors of the rotor segment. Furthermore, the radial spacing of the first fastening connectors of the rotor segment is larger than the radial spacing of the first fastening connectors of the stator segment. In particular, the radial spacings of the second fastening connectors of the rotor and stator segment are identical.

Figure 4A:
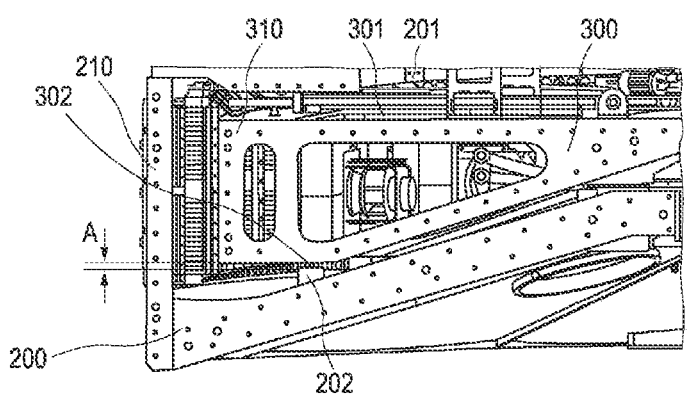
FIGS. 4a and 4b show a two-dimensional view of a further embodiment of a generator segment in the operation position.
Figure 4B:
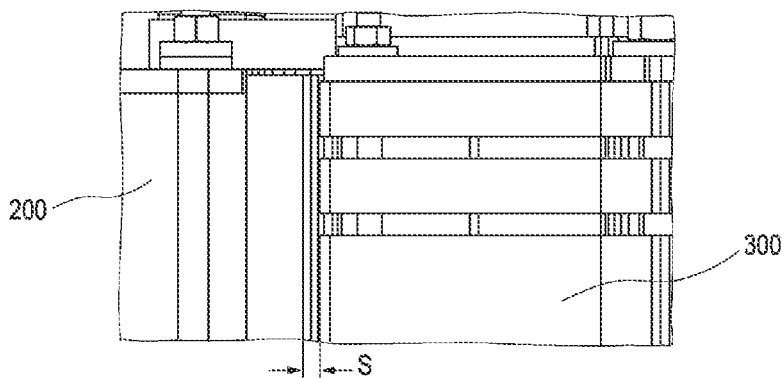
Figure 5A:
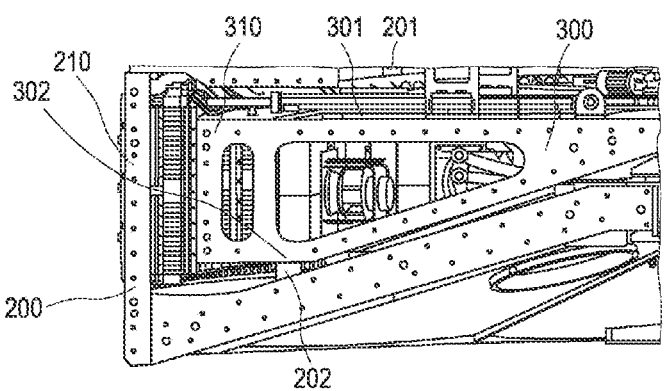
FIGS. 5a and 5b show a two-dimensional view of the embodiment of a generator segment shown in FIGS. 4a and 4b in the transport position.

FIGS. 4a and 5a show a schematic partial lateral view of a preferred embodiment of a generator segment 10 of a segmented generator 1. The generator segment 10 illustrated in FIGS. 4a to 5b has a rotor segment 200 and a stator segment 300.

Figure 5B:
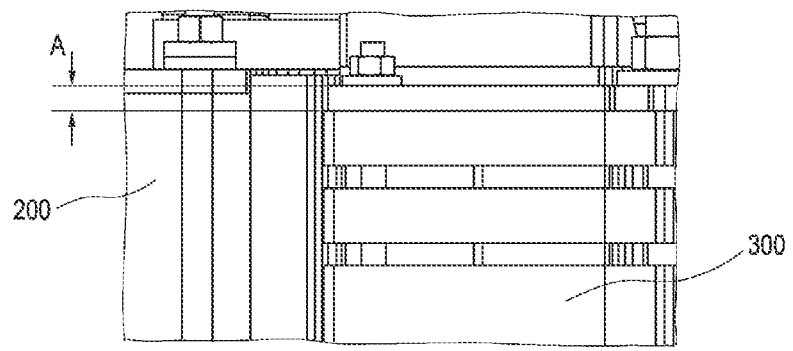

The generator segment 10 is illustrated in the operation position in FIG. 4a. FIG. 5a shows the generator segment 10 in the transport position. A detailed view of the air gap S and of the axial spacing A between the rotor segment 200 and the stator segment 300 of the embodiment illustrated in FIGS. 4a and 4b is illustrated in the respective position in FIGS. 4b and 5b. The detailed views in FIGS. 4b and 5b highlight in particular that the air gap S in the operation position of the generator segment illustrated in FIG. 4b and in the transport position illustrated in FIG. 5b is identical.

In this preferred embodiment the annularly configured rotor segment 200 extends in the radial direction between a radially inner flange for fastening the rotor segment to a rotor main body flange 404 of a bearing unit 400 and a radially outer magnet carrier segment 210. The at least one rotor laminated core is disposed on the magnet carrier segment 210. The magnet carrier segment 210 and the at least one rotor laminated core are preferably welded to one another. At least one magnet unit is in turn disposed on the at least one rotor laminated core. The at least one magnet unit is in particular connected in a materially integral manner to the laminated rotor core. A casting compound, which at least partially encloses the magnet unit, preferably connects the magnet unit to the rotor laminated core. In the preferred embodiment illustrated here, the at least one magnet unit forms a rotor internal circumferential face.

In this preferred embodiment, the annularly configured stator segment 300 has a coil carrier segment 310, a stator laminated core, a stator fastening device, and at least one coil unit. The stator segment preferably extends in the radial direction between a radially inner flange for fastening the stator segment to a stator main body flange 402 of a bearing unit 400, and a radially outer coil carrier segment 310. In the present preferred embodiment, the stator segment 300 is configured as a shell structure extending in the shape of a truncated pyramid from the flange to the coil carrier segment 310, wherein the cross section of the stator segment 300 increases from the flange to the stator segment. The at least one stator laminated core is disposed on the coil carrier segment 310. At least one coil unit is in turn disposed on the at least one stator laminated core. In the preferred embodiment illustrated here, the at least one stator laminated core and/or the at least one coil unit form a stator external circumferential face.

It can be seen that the embodiment of the generator segment 10 illustrated in FIGS. 4a to 5b on the rotor segment 200 and the stator segment 300 has first and second fastening connectors 201, 202, 301, 302.

Figure 6:
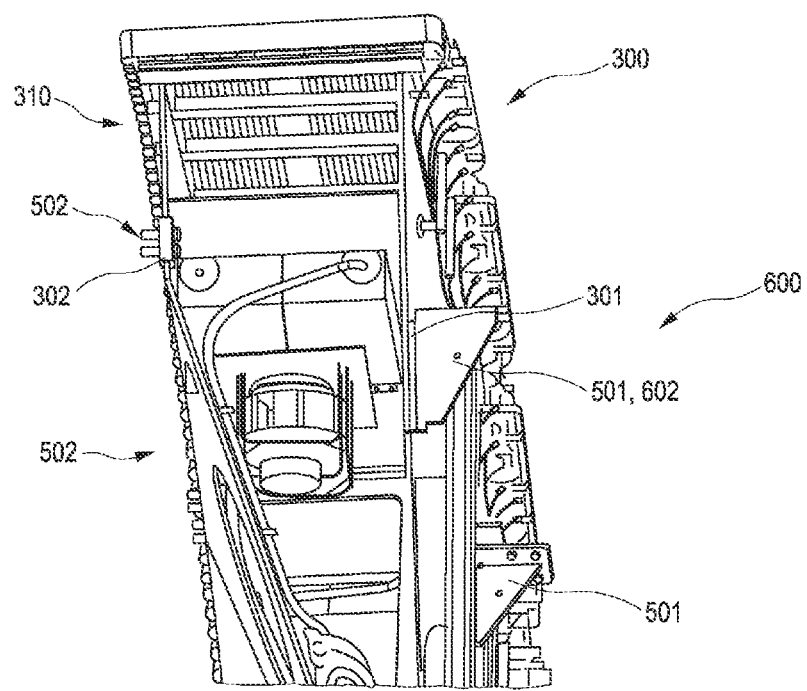
FIG. 6 shows a two-dimensional view of a preferred embodiment of a stator segment of a generator segment.

A stator segment 300 based on the embodiment illustrated in FIGS. 4a to 5b is illustrated in FIG. 6. The stator segment 300 illustrated in FIG. 6 additionally comprises a fastening device 500 by way of which the stator segment 300 and the rotor segment 200 can be releasably fastened to one another. The fastening device 500 comprises a first fastening unit 501 having an angular element with two fastening faces and a screw device which is fastened to the first fastening connector 301 of the stator segment 300. Furthermore, the fastening device 500 has a second fastening unit 502 with a screw device, which are disposed on the second fastening connectors 302 of the stator segment 300.

Figure 7:
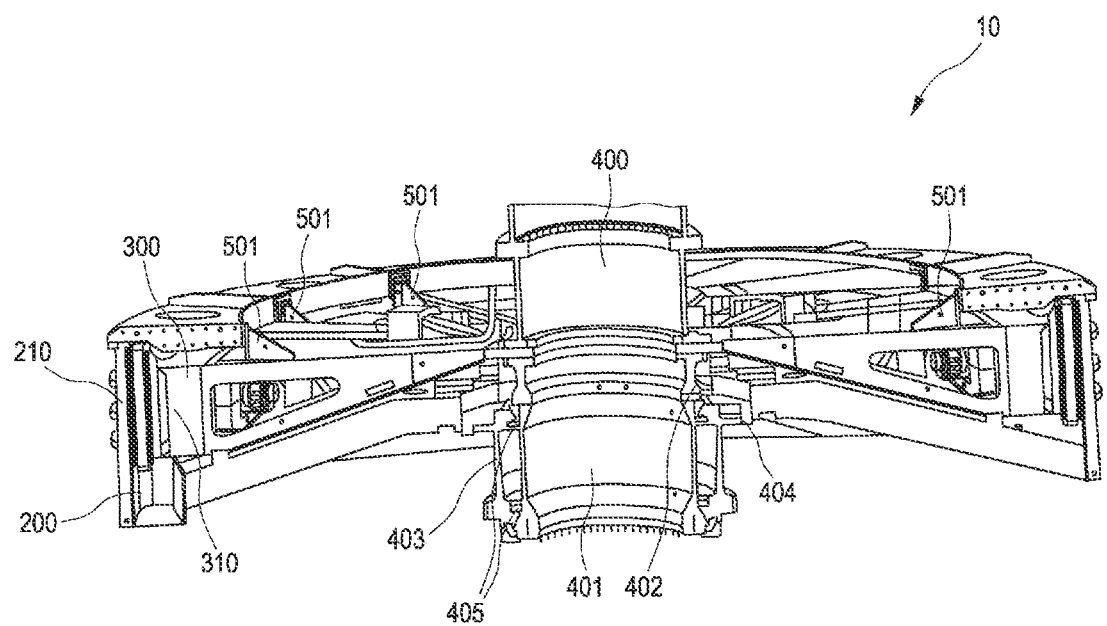
FIG. 7 shows a three-dimensional view of a generator segment of a segmented generator according the preferred embodiment illustrated in fragments in FIGS. 4a to 5b.

A generator segment 10 of a segmented generator 1 according to the preferred embodiment of a generator segment 10 illustrated in fragments in FIGS. 4a to 5b is shown in FIG. 7. The generator segment 10 extends substantially orthogonally to the circumferential direction, between a first and a second separation interface. The first and the second separation interface define a first and a second separation interface plane, within which the rotation axis D extends. The first and the second separation interface of the generator segment have a connection device which is configured to connect adjacent generator segments, which are disposed to form a segmented generator, to one another. In the preferred embodiment, the connection device of the first and the second separation interface is configured to mechanically connect adjacent generator segments. For this purpose, the first and the second separation interface have a flange connection and a threaded connection as a connection device. The explanations pertaining to the generator segment can apply in an analogous manner to a rotor segment of a segmented rotor and/or a stator segment of a segmented stator.

Figure 8:
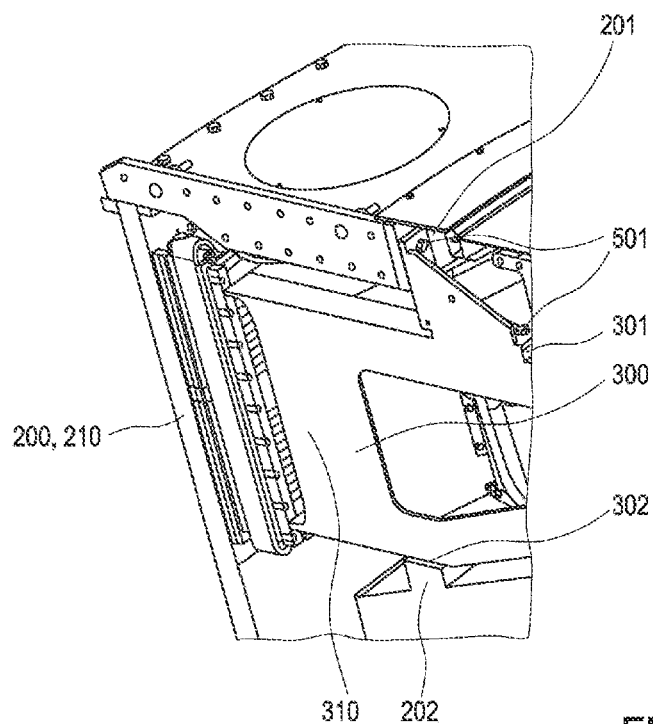
FIG. 8 shows a three-dimensional detailed view of a potential embodiment of the flange connection illustrated in FIG. 7, on a first separation interface of a generator segment.
Figure 10:
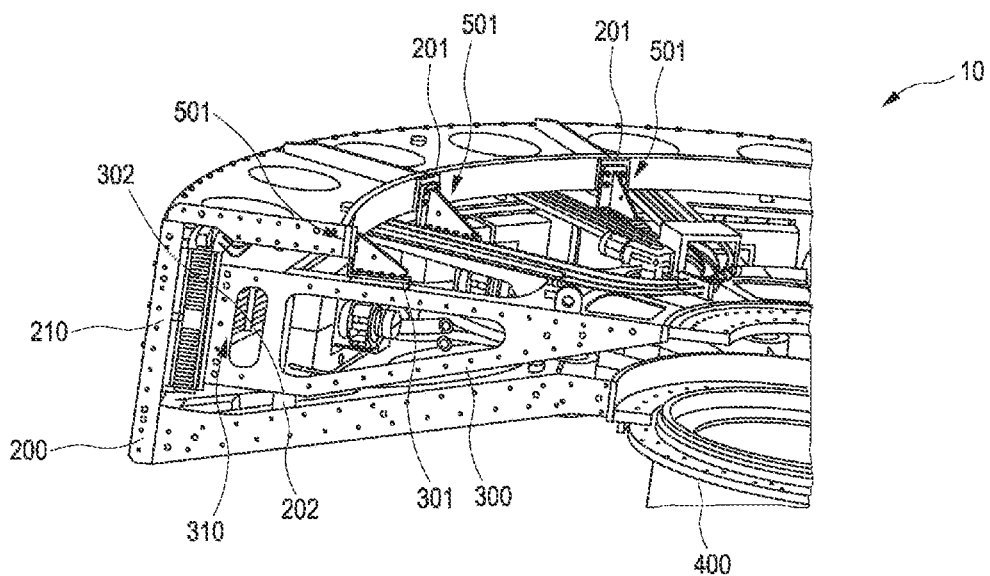
FIG. 10 shows a three-dimensional view of the preferred embodiment illustrated in fragments in FIGS. 4a to 5b.

FIG. 8 shows a detailed view of a potential embodiment of the flange connection illustrated in FIG. 7, on the first separation interface. FIGS. 4a, 5a and 10 show a further preferred embodiment of a flange connection on the first and the second separation interface.

It is to be understood that the first fastening unit 501, in particular the angular element, on the first and the second separation interface, is configured as half of an angular element. A fastening unit 501 which is correspondingly configured as half an angular element is shown in FIGS. 6 to 8, for example.

Figure 9:
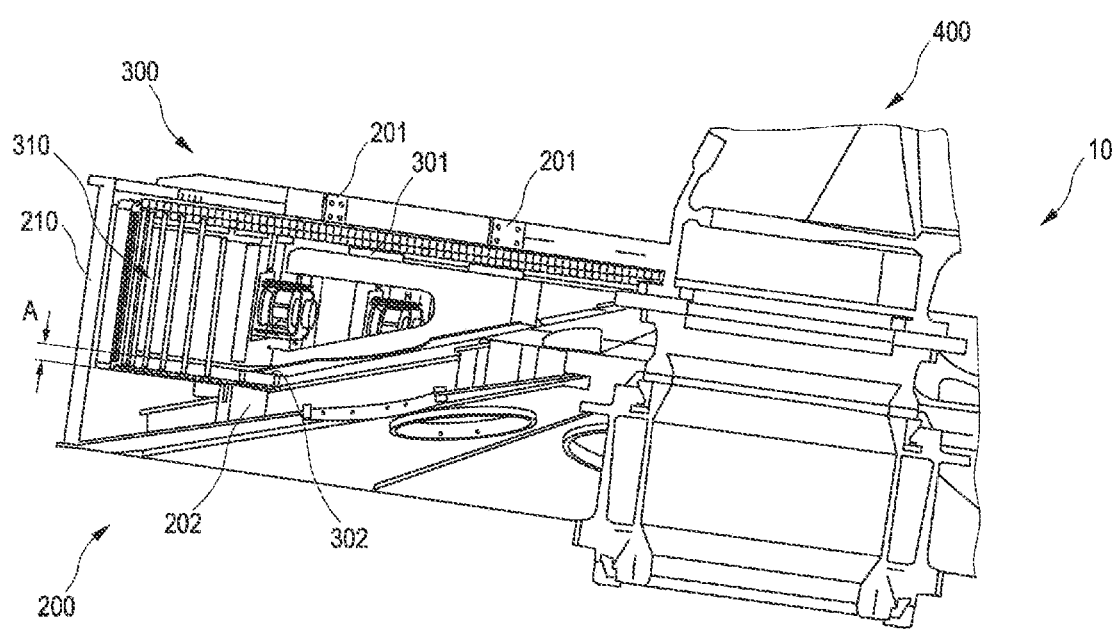
FIG. 9 shows a three-dimensional view of a generator segment of a segmented generator in a further preferred embodiment.
Figure 11A:
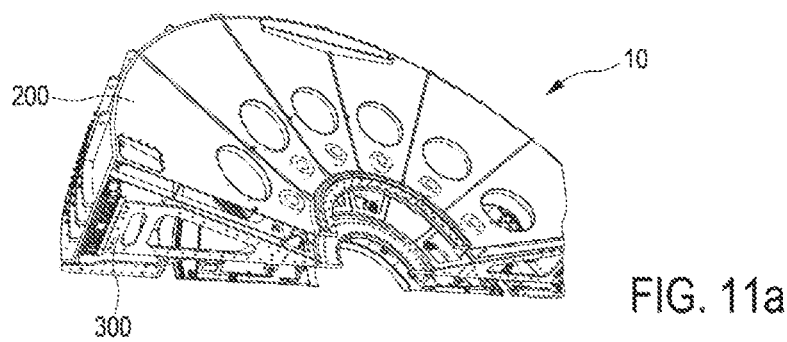
FIGS. 11a and 11b show a three-dimensional view of a generator segment of a segmented generator in a further preferred embodiment.
Figure 11B:
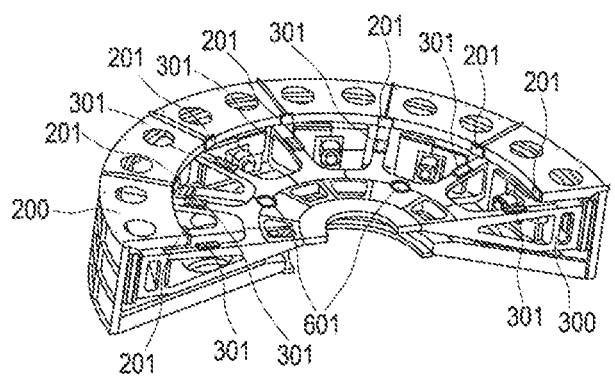

FIGS. 9 and 11 show in each case a three-dimensional view of a generator segment of a segmented generator in a further preferred embodiment.

Figure 12:
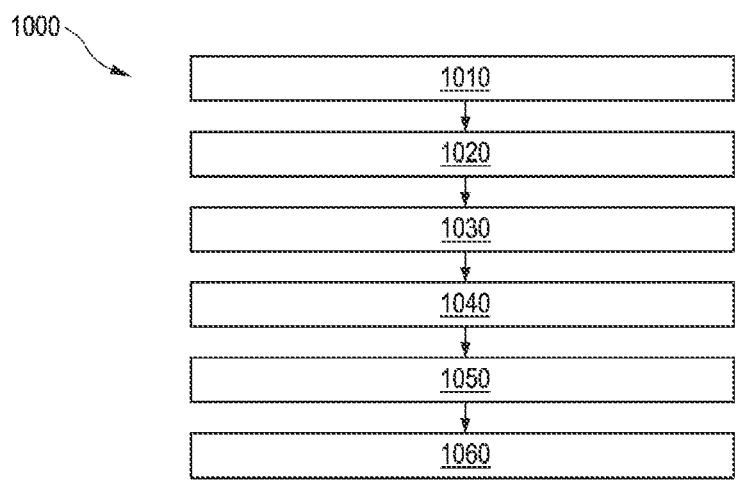
FIG. 12 shows a schematic flowchart which by way of example shows steps of a preferred embodiment of a method for preparing transportation of a segmented generator of a wind turbine.

FIG. 12 shows a schematic flowchart which by way of example shows steps of a preferred embodiment of a method 1000 for preparing transportation of a segmented generator of a wind turbine.

The method 1000 for preparing transportation of a segmented generator 1 of a wind turbine 100 comprises providing 1010 a segmented generator 1, as has been described above, for example, and displacing 1020 the rotor 106 and the stator 109 of the produced segmented generator 1 in the operation position relative to one another along the rotation axis D of the rotor 106 by the axial spacing A, from the operation position to the transport position that is different from the operation position. Performed thereafter is releasing 1030 the rotor 106 from the bearing unit 400, and fixing 1040 the rotor 106 and the stator 109 to one another in the transport position by way of the fastening device 500. The step of fixing preferably comprises in particular providing a first and a second fastening unit 501, 502, disposing the first and the second fastening unit 501, 502 on the stator, aligning the first fastening unit 501 in relation to the rotor and fastening the rotor 106 and the stator 109 to one another by way of the first and the second fastening unit 501, 502. It is furthermore preferred that the rotor 106 and the stator 109 are guided 1050 relative to one another by way of a guide device 600 during the step of displacing the rotor 106 and the stator 109 of the produced segmented generator 1 in the operation position relative to one another, from the operation position to the transport position and/or vice versa. It is to be understood that during the step of displacing the rotor 106 and the stator 109 of the produced segmented generator 1 in the operation position relative to one another along the rotation axis D of the rotor 106 by the axial spacing A, from the operation position to a transport position (and vice versa), the air gap S in the radial direction remains substantially constant. Thereafter, the segmented generator 1 is divided 1060 into two or more generator segments 10.

Figure 13:
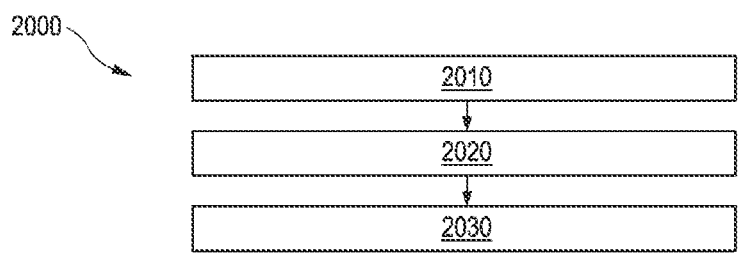
FIG. 13 shows a schematic flowchart which by way of example shows steps of a preferred embodiment of a method for transporting a segmented generator of a wind turbine.
Figure 14:
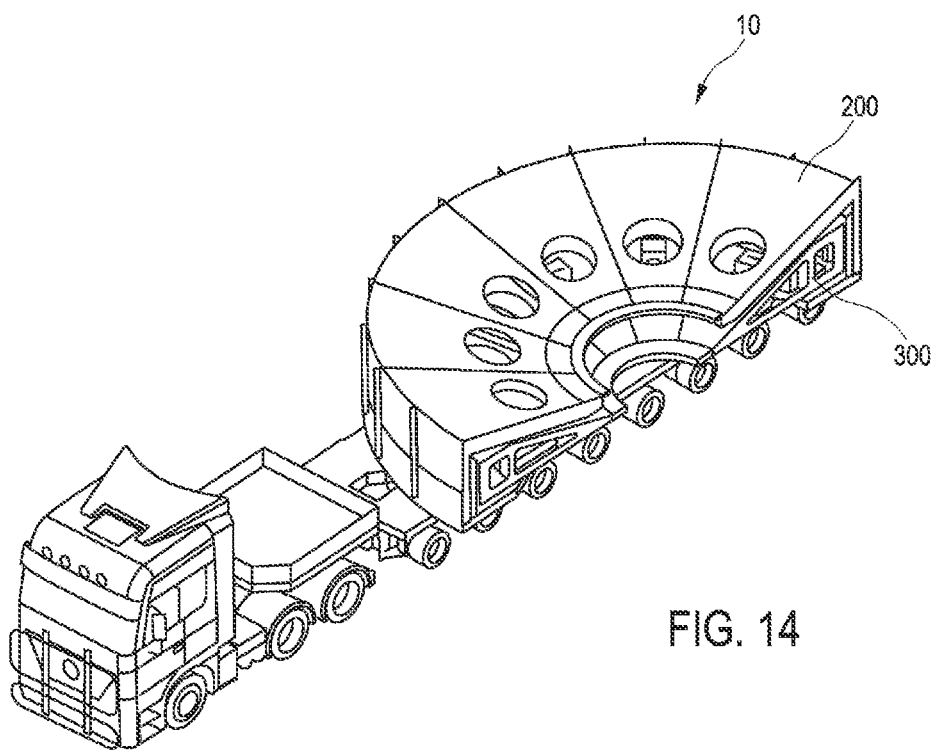
FIG. 14 shows a three-dimensional view of a divided generator which for transportation is disposed on a transport device.

FIG. 13 shows a schematic flowchart which by way of example shows steps of a preferred embodiment of a method 2000 for transporting a segmented generator of a wind turbine. FIG. 14 shows a generator segment which has been prepared according to the method for preparing transportation described above and is disposed on a transport device, a motor truck, for transportation from the works to the installation site.

The method 2000 for transporting a segmented generator 1 of a wind turbine 100 firstly comprises providing 2010 a segmented generator 1 which for transportation has divided into two or more generator segments 10 according to the method for preparing transportation described above. Performed thereafter is disposing and fastening 2020 the generator segment 10 of the provided two or more generator segments 10 of the divided segmented generator 1 on a transport device, and transporting 2030 the generator segment 10 disposed and fastened on the transport device by the transport device. The generator segment divided for transportation can particularly advantageously be mounted on the transport device without any further auxiliary means, and be fixed, for example, with lashing devices such as, for example, lashing chains or the like.

Figure 15:
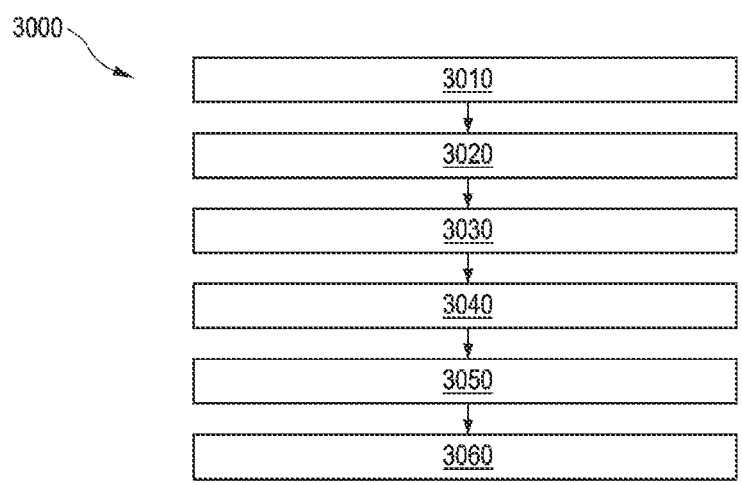
FIG. 15 shows a schematic flowchart which by way of example shows steps of a preferred embodiment of a method for assembling a segmented generator of a wind turbine.

FIG. 15 shows a schematic flowchart which by way of example shows steps of a preferred embodiment of a method 3000 for assembling a segmented generator of a wind turbine.

The method 3000 for assembling the segmented generator 1 of a wind turbine 100 firstly comprises providing 3010 the two or more generator segments 10 of the divided segmented generator 1 in the transport position according to the method for preparing transportation described above, and subsequently disposing 3020 the provided two or more generator segments 10 of the segmented generator 1 so as to form a segmented generator 1 in the transport position. The adjacent generator segments 10 which in the circumferential direction are joined in an annular manner so as to form a segmented generator 1 are fastened 3030 to one another. Thereafter, the provided two or more generator segments 10 of the divided segmented generator 1 are fastened 3040 to a bearing unit 400.

The step of fastening 3040 the provided two or more generator segments 10 of the divided segmented generator 1 to the bearing unit 400 comprises in particular the following steps: Firstly, aligning the bearing unit 400 radially on the stator, and fastening the bearing unit 400 to the stator. Performed thereafter is releasing the fastening device 500 from the rotor 106 and the stator 109 in the transport position, and sliding the rotor 106 onto the bearing unit 400, wherein the bearing unit serves in particular as a guide device for the rotor 106. Thereafter, the rotor 106 is displaced in relation to the stator 109 in a mutually relative manner along the rotation axis D of the rotor 106 by the axial spacing A, from the transport position to the operation position, and the bearing unit 400 is fastened to the rotor 106.

Figure 16:
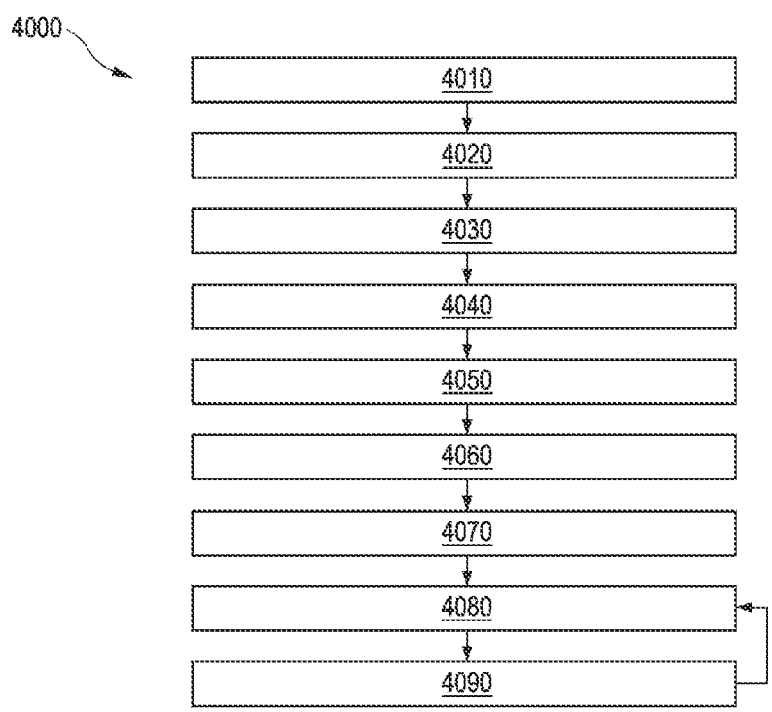
FIG. 16 shows a schematic flowchart which by way of example shows steps of a preferred embodiment of a method for assembling a wind turbine.
Figure 17:
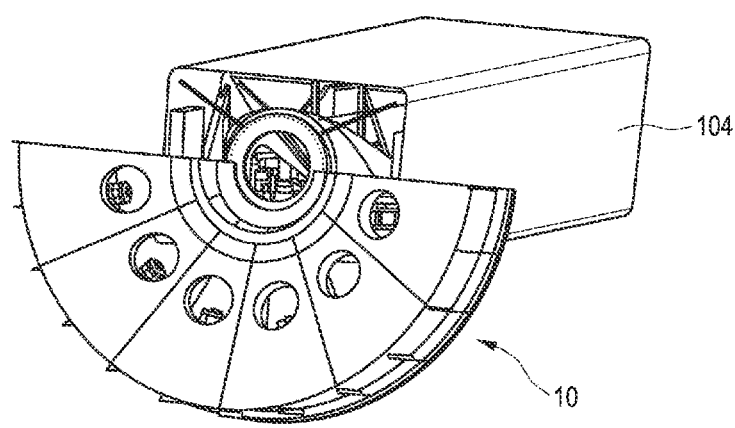
FIG. 17 shows a three-dimensional view of a single generator segment assembled on a machine support of a nacelle.
Figure 18A:
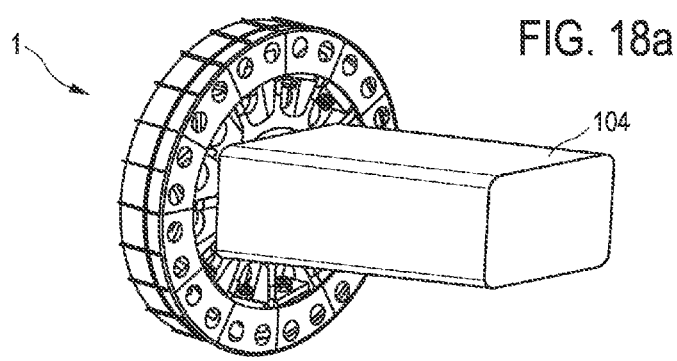
FIGS. 18a and 18b show a three-dimensional view according to FIG. 14, having a second generator segment assembled on the machine support of the nacelle, in a front and a rear view.
Figure 18B:
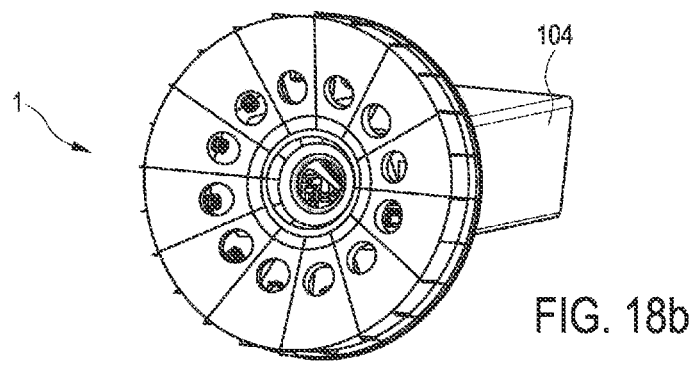
Figure 19:
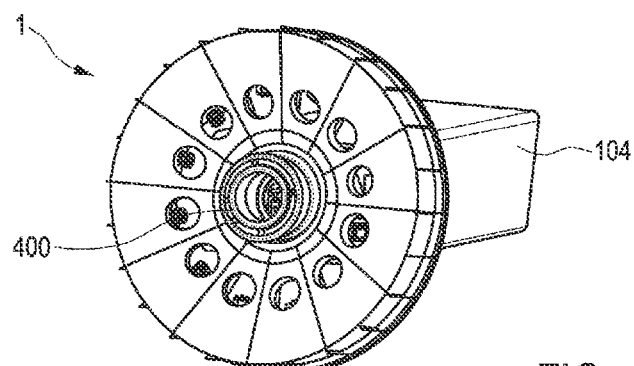
FIG. 19 shows a three-dimensional view according to FIGS. 15a and 15b having an assembled bearing unit.

FIG. 16 shows a schematic flowchart which by way of example shows steps of a preferred embodiment of a method 4000 for assembling a wind turbine. The individual intermediate steps for assembling the wind turbine are illustrated by way of example in FIGS. 17 to 19.

The method 4000 for assembling a wind turbine comprises providing 4010, 4020 a tower of a wind turbine 100 in a state for installation having disposed thereon a nacelle 104 with a machine support 105 and the two generator segments 10 of the divided segmented generator 1 according to the described method for preparing transportation, in each case in the transport position. Thereafter, the two provided generator segments 10 are sequentially fastened 4030 to the machine support 105 and disposed so as to form a segmented generator. FIGS. 14, 15a, and 15b schematically show the individual steps of the sequential fastening of the two generator segments to the machine support 105. Performed thereafter is providing 4040 a bearing unit 400 and fastening 4050 the latter to the machine support 105 and the stator segments 300. It is to be understood in particular that the stationary bearing part 402 is connected to the machine support 105. The bearing unit 400 fastened to the machine support 105 and the stator segments 300 is shown by way of example in FIG. 16. Thereafter, the segmented rotor of the segmented generator 1 is displaced 4060 relative to the segmented stator of the segmented generator 1 along the rotation axis D by the axial spacing A, from the transport position to the operation position, and the segmented rotor is fastened 4070 to the bearing unit 400, in particular to the rotating bearing part 403, in the operation position. As soon as the individual rotor and stator segments have been fastened to the bearing unit, fastening 4090 the adjacent generator segments 10 in the circumferential direction to one another so as to form the segmented generator is performed.

This takes place by way of the previously described connection flanges on the first and the second separation interface of each generator segment 10. To this end, the generator segments 10 which are to be fastened to one another in the circumferential direction, or the rotor segments to the fastened to one another, firstly are rotated 4080 so that the separation interfaces of adjacent generator segments 10 are aligned above the nacelle. Once the adjacent generator segments are fastened 4090 to one another at the separation interfaces aligned above the nacelle, the generator is rotated 4080 to the next separation interfaces of adjacent generator segments that are to be fastened 4090 to one another. This is repeated until all adjacent generator segments or rotor segments in the circumferential direction are connected to one another. It is to be understood that the number of repetitions of the method steps of rotating 4080 and of fastening 4090 correspond to the number of generator segments 10 to be assembled of the segmented generator to be assembled. This procedure enables assembling of the segmented generator, in particular of a segmented generator configured as an external rotor, with a comparatively high level of occupational safety. Once this has been performed and the other customary assembling steps have been completed, the wind turbine is in the operating state and can convert the kinetic energy of the wind into electric energy.

LIST OF REFERENCE SIGNS

1 Segmented generator
10 Generator segment
100 Wind turbine
102 Tower
104 Nacelle
105 Machine support
106 Rotor
106a Aerodynamic rotor
108 Rotor blades
109 Stator
110 Spinner
200 Rotor segment
201 First fastening connector of the rotor segment
202 Second fastening connector of the rotor segment
210 Magnet carrier segment
300 Stator segment
301 First fastening connector of the stator segment
302 Second fastening connector of the stator segment
310 Coil carrier segment
400 Bearing unit
401 Stationary bearing part
402 Stator main body flange
403 Rotating/rotatable bearing part
404 Rotor main body flange
405 Bearing elements
500 Fastening device
501 First fastening unit
502 Second fastening unit
600 Guide device
601 First guide unit
602 Second guide unit
A Axial spacing
D Rotation axis
S Air gap

The invention claimed is:

1. A generator segment of a segmented generator of a wind turbine, comprising:
a rotor segment of a rotor, wherein the rotor segment extends in a radial direction between a radially inner flange for securing the rotor segment to a rotor base member flange of a bearing unit and a radially outer magnet carrier segment; and a stator segment of a stator, wherein the stator segment extends in the radial direction between a radially inner flange for securing the stator segment to a stator base member flange of the bearing unit and a radially outer coil carrier segment, wherein the rotor segment and the stator segment in an operation position are disposed so as to be mutually spaced apart in a radial direction by an air gap, and are disposed so as to be mutually spaced apart in an axial direction by an axial spacing, wherein the rotor segment and the stator segment are able to be disposed and/or displaced relative to one another along a rotation axis by the axial spacing, between an operation position and a transport position that is different than the operation position.

2. The generator segment as claimed in claim 1, wherein the air gap in the operation position corresponds to the air gap in the transport position.

3. The generator segment as claimed in claim 1, wherein:
the rotor segment has a plurality of first and/or second fastening connectors, wherein the plurality of first and/or second fastening connectors are disposed so as to be mutually equidistant in a circumferential direction; and/or
the stator segment has a plurality of first and/or second fastening connectors, wherein the plurality of first and/or second fastening connectors are disposed so as to be mutually equidistant in a circumferential direction;
wherein the rotor segment and the stator segment in the transport position are connected to one another by way of the respective first and/or second fastening connectors.

4. The generator segment as claimed in claim 1, further comprising:
a fastening device for fixing the rotor segment to the stator segment in the transport position, wherein the fastening device comprises one first and second fastening unit, wherein the first fastening unit is different than the second fastening unit; and/or
a guide device for guiding the mutually displaceable rotor segment and stator segment along the rotation axis, from the operation position to the transport position and/or vice versa; wherein the guide device comprises one first and second guide unit, wherein the first guide unit is different than the second guide unit.

5. The generator segment as claimed in claim 4, wherein:
the fastening device comprises a screw device for fixing the rotor segment to the stator segment in the transport position; and/or
the first fastening unit has an angular element having two fastening faces, each having one or a plurality of elongate bores configured as through bores, and one screw device; and/or
the second fastening unit has a screw device; and/or
the guide device comprises one or a plurality of locking pins configured as the first guide unit; and/or
the first fastening unit is configured as the second guide unit.

6. A segmented generator, for a wind turbine, comprising two or a plurality of generator segments as claimed in claim 1, which are disposed in an annular manner.

7. A wind turbine comprising a segmented generator as claimed in claim 6.

8. The generator segment as claimed in claim 1, wherein the generator segment is a generator segment of a permanently excited segmented rotary generator.

9. A method for preparing transportation of a segmented generator of a wind turbine, the segmented generator having:
a stator having two or more stator segments, wherein each stator segment extends in the radial direction between a radially inner flange for securing the stator segment to a stator base member flange of a bearing unit and a radially outer coil carrier segment; and
a rotor having two or more rotor segments which are disposed concentrically with a rotation axis, wherein each rotor segment extends in a radial direction between a radially inner flange for securing the rotor segment to a rotor base member flange of the bearing unit and a radially outer magnet carrier segment;
wherein the rotor and the stator in an operation position are disposed so as to be mutually spaced apart in a radial direction by an air gap, and are disposed so as to be mutually spaced apart in an axial direction by an axial spacing;
wherein one stator segment of the two or more stator segments and one rotor segment of the two or more rotor segments form in each case one generator segment;
wherein the method comprises:
providing the segmented generator; and
displacing the rotor and the stator of the produced segmented generator in the operation position relative to one another along the rotation axis of the rotor by the axial spacing, from the operation position to a transport position that is different than the operation position.

10. The method as claimed in claim 9, wherein the method further comprises:
releasing the rotor and/or the stator from the bearing unit.

11. The method as claimed in claim 9, wherein:
the segmented generator includes:
a fastening device, wherein the fastening device comprises one first and/or second fastening unit, wherein the first fastening unit is different than the second fastening unit; and/or
a guide device, wherein the guide device comprises one first and/or second guide device, wherein the first guide device is different than the second guide device; and
the method further comprises:
fixing the rotor and the stator to one another in the transport position by way of the fastening device, wherein fixing comprises at least one of the following:
providing a first and/or a second fastening unit; and/or
disposing the first and/or the second fastening unit on the stator; and/or
aligning the first fastening unit in relation to the rotor; and/or
fastening the rotor and the stator to one another by way of the first and/or the second fastening unit; and/or
guiding the rotor and the stator relative to one another by way of a guide device during the displacing the rotor and the stator of the produced segmented generator in the operation position relative to one another, from the operation position to the transport position and/or vice versa.

12. The method as claimed in claim 9, wherein during the displacing the rotor and the stator of the produced segmented generator in the operation position relative to one another along the rotation axis of the rotor by the axial spacing, from the operation position to a transport position and/or vice versa, the air gap in the radial direction remains substantially constant.

13. The method as claimed in claim 9, the method further comprising:
dividing the segmented generator into two or more generator segments.

14. A method for transporting a segmented generator of a wind turbine, the method comprising:
providing a segmented generator for transportation, the providing the segmented generator including the method of claim 13; and
disposing and fastening one generator segment of the provided two or more generator segments of the divided segmented generator on a transport device; and/or
transporting the generator segment disposed and fastened on the transport device by the transport device.

15. A method for assembling a segmented generator of a wind turbine, the method comprising:
providing two or more generator segments, the providing the two or more generator segments including the method of claim 13; and
disposing the provided two or more generator segments of the segmented generator so as to form a segmented generator in the transport position by way of a fastening device; and
fastening adjacent generator segments of the two or more generator segments disposed in an annular manner so as to form a segmented generator; and/or
fastening the provided two or more generator segments of the divided segmented generator to the bearing unit.

16. The method as claimed in claim 15, wherein the fastening the two or more provided generator segments of the divided segmented generator to the bearing unit comprises at least one of the following:
aligning the bearing unit radially on the stator; and/or
fastening the stator base member flange of the bearing unit to the stator; and/or
releasing the fastening device from the rotor and the stator in the transport position; and/or
sliding the rotor onto the rotor base member flange of the bearing unit,
wherein the bearing unit serves as a guide device for the rotor; and/or
displacing the rotor in relation to the stator in a mutually relative manner along the rotation axis of the rotor by the axial spacing, from the transport position to the operation position; and/or
fastening the rotor base member flange of the bearing unit to the rotor.

17. A method for assembling a wind turbine comprising:
providing a tower of a wind turbine in a state for installation having disposed thereon a nacelle with a machine support; and
providing two or more generator segments of a divided segmented generator, the providing two or more generator segments including the method of claim 13; and
sequentially fastening the provided two or more generator segments of the divided segmented generator to the machine support so as to form a segmented generator; and
providing the bearing unit; and
fastening the bearing unit to the machine support of the nacelle, and/or to the two or plurality of generator segments and to a segmented stator of the segmented generator; and
displacing a segmented rotor of the segmented generator relative to the segmented stator of the segmented generator along a rotation axis by the axial spacing, from a transport position to an operation position, wherein the operation position is different than the transport position; and fastening the segmented rotor to the bearing unit in the operation position; and
rotating the segmented rotor fastened to the bearing unit; and
fastening generator segments adjacent in a circumferential direction to one another so as to form the segmented generator, and fastening the rotor segments disposed adjacently in the circumferential direction so as to form a segmented rotor.

* * * * *